Sept. 8, 1942.  P. H. BRACE  2,295,382
DEVICE FOR MAGNETIC MEASUREMENTS AND INSPECTION
Filed July 12, 1940

WITNESSES:
C. J. Weller.
Wm. J. Ruano

INVENTOR
Porter H. Brace.
BY
Paul E. Friedemann
ATTORNEY

Patented Sept. 8, 1942

2,295,382

UNITED STATES PATENT OFFICE 2,295,382

DEVICE FOR MAGNETIC MEASUREMENTS AND INSPECTION

Porter H. Brace, Forest Hills, Pa., assignor to Westinghouse Electric & Manufacturing Company, East Pittsburgh, Pa., a corporation of Pennsylvania Application July 12, 1940, Serial No. 345,058

3 Claims. (Cl. 175—183)

My invention relates to a measuring device for measuring absolute values of magnetic field intensity of either constant or variable magnetic fields.

In present day industrial practice vast numbers of iron and steel parts are made which must be carefully inspected to avoid irregularities and defects which might cause expensive or disastrous service failures. Mechanical and metallurgical irregularities nearly always produce detectable magnetic effects.

This application is a continuation-in-part of an earlier filed application by me jointly with C. S. Williams, Serial No. 238,600, filed November 3, 1938, entitled Electromagnetic testing system and assigned to the same assignee as the present application.

An object of my invention is to provide improved means for detecting and measuring magnetic fields with particular reference to the magnetic inspection of metal parts.

Another object of my invention is to provide a magnetic detector which is not dependent upon the rate of change of a magnetic field and which measures absolute values of magnetic field intensity even when no changes occur in the magnetic field.

Figure 1:
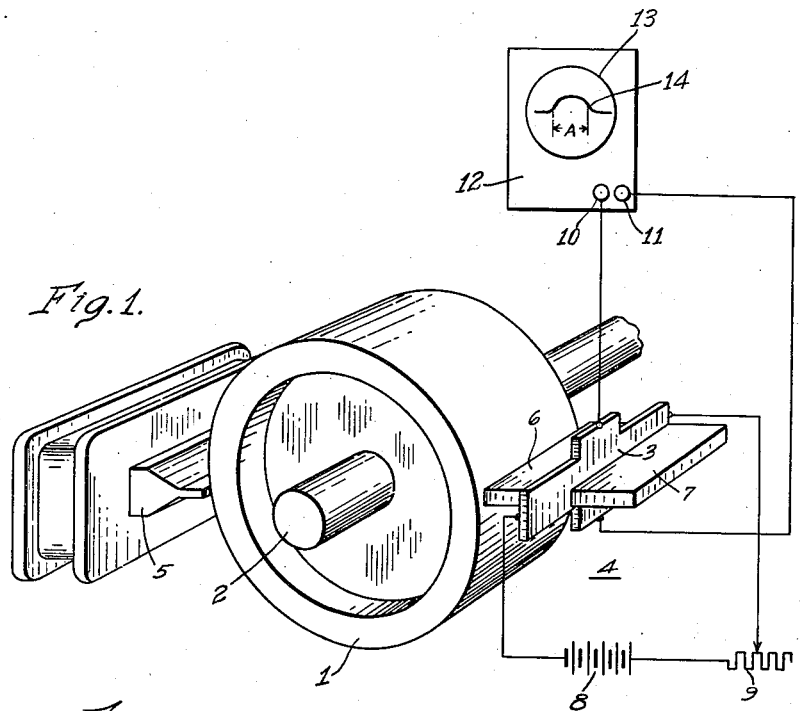
Figure 2:
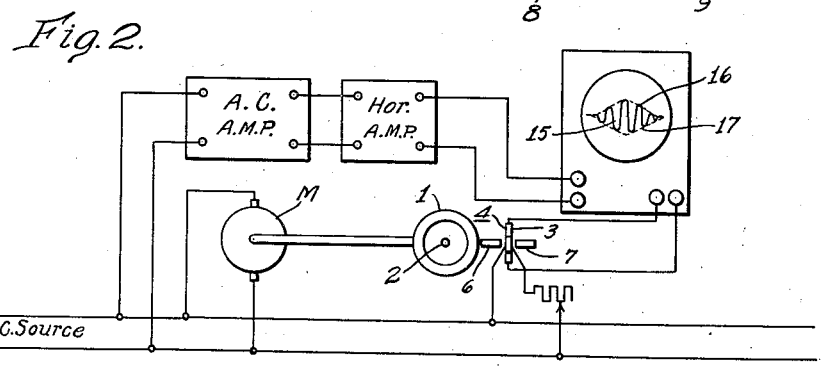

Other objects and advantages will become more apparent from a study of the following specification when considered in conjunction with the accompanying drawing, in which:

Figure 1 is a schematic showing of a system embodying the principles of my invention; and Fig. 2 is a modification of the system shown in Fig. 1.

In the past the "Hall effect" phenomena has been used in scientific research for determining the conductivity and molecular structure of metals. I have found an entirely new use of the Hall phenomena never before contemplated as far as I am aware as will appear hereinafter.

The operation of my device may be described as follows. Referring to Fig. 1, numeral 1 denotes a magnetizable metal article, such as a roller bearing race, which is to be inspected magnetically to determine whether or not defects such as cracks, irregularities of composition or non-uniformities of metallurgical structure are present.

The spindle 2, upon which the piece to be inspected is mounted, may be rotated so that the surface of the test piece moves past the pole 3 of the magnetic detector 4. By means of a magnet 5 the surface of the test specimen is magnetized radially. The intensity of the radial magnetic field will be selected with reference to the magnetic properties of the specimen. Cracks, even when invisible, soft or hard spots, etc., will all be reflected in variations of the external field of the test piece after magnetization. After the specimen 1 is magnetized, the magnet 5 can be deenergized or entirely removed from the remainder of the structure.

The function of the detector element 4 is to enable the magnetic field at any point on the surface of the test piece to be measured. Magnetizable elements 6 and 7 are made from a high permeability, low hysteresis material such as silicon-iron or certain iron-nickel alloys of the type of "Hipernik" or "Permalloy," for example.

The pole or plate 3, which is preferably of the shape of a cross, is in effect a "Hall element" of metal (such as bismuth or tellurium), metal oxide (titanium oxide or copper oxide), or other substance displaying the Hall effect arranged so that magnetic flux from the magnetizable element 6 passes through it and thence into a second magnetizable element 7. Current, as from a battery 8, which is variable by means of a variable resistor 9, passes through the Hall element 3 in the direction of its long axis. Thus there is current, called the exciting current, perpendicular to the direction of the magnetic field and as a result of the Hall phenomenon a transverse E. M. F. is generated which may be detected at the terminals 10—11, called the Hall terminals. At these terminals voltages of the order of millivolts are generated which can be measured by a millivoltmeter (not shown) if desired. This E. M. F. is proportional to the magnetic field and to the intensity of the exciting current. Thus, with constant exciting current, the Hall E. M. F. is a measure of the magnetic flux traversing the Hall element and, therefore, through the magnetizable element 6, of the magnetization of the surface of the test piece.

In order to visualize the variations of magnetization of the surface of the test piece the Hall terminals may be connected, through a suitable amplifier if desired, as 12, to a cathode ray oscilloscope 13, or equivalent device. The amplified output from the Hall terminals may, for example, go to those elements of the oscilloscope causing vertical deflection of the electron beam while by known means (not shown), the beam is given a transverse sweep in synchronism with the rotation of the test piece. As a result there will appear on the oscilloscope screen a trace which shows the intensity of radial magnetization of the test piece with reference to a horizontal base line. This trace might have a form such as that of the curve 14, the portion A, for example, representing a hard region which had retained a greater degree of magnetization than the surrounding material.

Thus I have provided a means for visualizing and if desired, measuring the distribution of the magnetic field about the test piece and thereby detecting and locating defects and irregularities in a rapid and inexpensive way.

My system has an advantage over others, such as shown in the copending application referred to above, in which a detector system comprises a coil wound on the magnetizable element of the element in that the latter measures rates of change of magnetization and not absolute values as in my new scheme. Thus it is often quite difficult to infer the character of the defect under the old system and furthermore, the sensitivity is a function of the speed of rotation of the test piece. This is disadvantageous.

Both of these disadvantages are eliminated by my new device so that it is possible to explore a surface, point by point, thus doing away with the necessity for motion of the surface to be inspected relative to the detecting element.

In the foregoing description I have described the use of direct current for exciting the Hall element. Frequently the amplification problem is simplified if modulated alternating potentials can be used to represent the variables being studied. Therefore, I propose that alternating current exciting current may be applied to the Hall element. Under this condition the oscilloscope trace would have a form of the sort shown by Fig. 2, where the maxima of the sinusoidal curve 15 measures the field intensities at corresponding instants, while the envelope curves 16—17 reflect the distribution of magnetization around the periphery of the rotating test piece.

In order to provide a convenient distance scale, the test piece 1 may be driven by a synchronous motor M, energized at the exciting frequency or some multiple or sub-multiple of it. The loops of the sinusoidal trace on the oscilloscope screen will then provide a scale of distance along the surface of the specimen without the need for constant "sweep rate" of the oscilloscope beam.

I am, of course, aware that others, particularly after having had the benefit of the teachings of my invention, may devise other devices embodying my invention, and I, therefore, do not wish to be limited to the specific showings made in the drawing and the descriptive disclosure hereinbefore made, but wish to be limited only by the scope of the appended claims and such prior art that may be pertinent.

I claim as my invention:

1. Apparatus for measuring a variable magnetic field comprising a specimen, means for rotating said specimen, a relatively long and narrow magneto-sensitive Hall element which displays the "Hall effect" spaced closely to said specimen so as to be included in the magnetic field of said specimen, a magnetic pick-up element interposed between said specimen and magneto-sensitive element for directing magnetic flux to said element, a source of energizing potential applied to opposite longitudinal terminals of said Hall element, an oscilloscope and amplifier unit connected to extreme lateral points of said Hall element, said oscilloscope having its sweep circuit synchronized with said rotating specimen, thereby visibly producing a point by point indication of absolute value of magnetic field intensity on said specimen.

2. Apparatus for measuring a variable magnetic field comprising a specimen, a synchronous motor and alternating current supply source therefor for rotating said specimen, a relatively long and narrow magneto-sensitive Hall element which displays the "Hall effect" spaced closely to said specimen so as to be included in the magnetic field of said specimen, a source of alternating energizing potential applied to opposite longitudinal terminals of said Hall element which is at the same frequency as said alternating current supply source, an oscilloscope and amplifier unit connected to extreme lateral points of said Hall element, said oscilloscope having its sweep circuit synchronized with said rotating specimen, thereby visibly producing a point by point indicaton of absolute value of magnetic field intensity on said specimen.

3. Apparatus for measuring a variable magnetic field comprising a specimen, a synchronous motor and alternating current supply source therefor for rotating said specimen, a relatively long and narrow magneto-sensitive Hall element which displays the "Hall effect" spaced closely to said specimen so as to be included in the magnetic field of said specimen, a source of alternating energizing potential applied to opposite longitudinal terminals of said Hall element which is at the same frequency as said alternating current supply source, a pair of magnetic pick-up elements, one of which is interposed between said specimen and Hall element and the other of which is placed on the other side of said Hall element for concentrating and directing a magnetic flux through said Hall element, an oscilloscope and amplifier unit connected to extreme lateral points of said Hall element, said oscilloscope having its sweep circuit synchronized with said rotating specimen, thereby visibly producing a point by point indication of absolute value of magnetic field intensity of said specimen.

PORTER H. BRACE.